United States Patent
Martini et al.

(10) Patent No.: US 9,001,495 B2
(45) Date of Patent: Apr. 7, 2015

(54) HIGH POWER AND HIGH ENERGY ELECTRODES USING CARBON NANOTUBES

(75) Inventors: Fabrizio Martini, Boston, MA (US); Nicolo Michele Brambilla, Brookline, MA (US); Riccardo Signorelli, Cambridge, MA (US)

(73) Assignee: FASTCAP Systems Corporation, Boston, MA (US)

( * ) Notice: Subject to any disclaimer, the term of this patent is extended or adjusted under 35 U.S.C. 154(b) by 216 days.

(21) Appl. No.: 13/587,037

(22) Filed: Aug. 16, 2012

(65) Prior Publication Data

US 2013/0044405 A1 Feb. 21, 2013

Related U.S. Application Data

(60) Provisional application No. 61/494,164, filed on Jun. 7, 2011, provisional application No. 61/524,071, filed on Aug. 16, 2011, provisional application No. 61/525,326, filed on Aug. 19, 2011, provisional application No. 61/568,450, filed on Dec. 8, 2011, provisional application No. 61/569,010, filed on Dec. 9, 2011, provisional application No. 61/570,587, filed on Dec. 14, 2011, provisional application No. 61/602,121, filed on Feb. 23, 2011, provisional application No. 61/524,071, filed on Aug. 16, 2011.

(51) Int. Cl.
| | |
|---|---|
| H01G 9/00 | (2006.01) |
| H01G 11/28 | (2013.01) |
| B32B 37/00 | (2006.01) |
| H01G 11/36 | (2013.01) |
| H01G 11/70 | (2013.01) |
| H01G 11/86 | (2013.01) |
| B82Y 30/00 | (2011.01) |

(52) U.S. Cl.
CPC .............. *H01G 11/28* (2013.01); *B32B 37/025* (2013.01); *H01G 11/36* (2013.01); *H01G 11/70* (2013.01); *H01G 11/86* (2013.01); *Y02E 60/13* (2013.01); *B82Y 30/00* (2013.01)

(58) Field of Classification Search
CPC ....... H01G 9/155; H01G 9/016; H01G 9/058; H01G 11/12; H01G 11/28; H01G 11/36; H01G 11/84
USPC .................. 361/502–504, 509–512, 516–519, 361/301.2, 301.4, 525–529
See application file for complete search history.

(56) References Cited

U.S. PATENT DOCUMENTS

| | | |
|---|---|---|
| 3,982,182 A | 9/1976 | Hogg |
| 4,349,910 A | 9/1982 | Belz |

(Continued)

FOREIGN PATENT DOCUMENTS

| | | |
|---|---|---|
| JP | 2003133185 A | 5/2003 |
| WO | 9966985 A2 | 12/1999 |
| WO | 2008016990 A2 | 2/2008 |

OTHER PUBLICATIONS

International Search Report from PCT/US2007/068314, mailed Feb. 13, 2008.

(Continued)

*Primary Examiner* — Nguyen T Ha
(74) *Attorney, Agent, or Firm* — Wolf, Greenfield & Sacks P.C.

(57) ABSTRACT

An electrode useful in an energy storage system, such as a capacitor, includes an electrode that includes at least one to a plurality of layers of compressed carbon nanotube aggregate. Methods of fabrication are provided. The resulting electrode exhibits superior electrical performance in terms of gravimetric and volumetric power density.

19 Claims, 2 Drawing Sheets

(56) References Cited

U.S. PATENT DOCUMENTS

| | | | |
|---|---|---|---|
| 4,408,259 A | 10/1983 | Muranaka et al. | |
| 4,934,366 A | 6/1990 | Truex et al. | |
| 5,440,447 A | 8/1995 | Shipman et al. | |
| 5,441,827 A | 8/1995 | Gratzel et al. | |
| 5,476,709 A | 12/1995 | Inoue et al. | |
| 5,711,988 A | 1/1998 | Tsai et al. | |
| 5,923,619 A | 7/1999 | Knapen et al. | |
| 6,059,847 A | 5/2000 | Farahmandi et al. | |
| 6,193,779 B1 | 2/2001 | Reichert et al. | |
| 6,205,016 B1 | 3/2001 | Niu | |
| 6,232,706 B1 | 5/2001 | Dai et al. | |
| 6,257,332 B1 | 7/2001 | Vidrine et al. | |
| 6,304,427 B1 | 10/2001 | Reed et al. | |
| 6,350,488 B1 | 2/2002 | Lee et al. | |
| 6,388,423 B1 | 5/2002 | Schilleci, Jr. | |
| 6,413,285 B1 * | 7/2002 | Chu et al. | 29/623.4 |
| 6,444,326 B1 | 9/2002 | Smith | |
| 6,454,816 B1 | 9/2002 | Lee et al. | |
| 6,491,848 B1 | 12/2002 | Sato et al. | |
| 6,511,760 B1 | 1/2003 | Barone et al. | |
| 6,514,113 B1 | 2/2003 | Lee et al. | |
| 6,565,701 B1 | 5/2003 | Jerabek et al. | |
| 6,665,169 B2 | 12/2003 | Tennent et al. | |
| 6,764,874 B1 | 7/2004 | Zhang et al. | |
| 6,843,119 B2 | 1/2005 | Patey et al. | |
| 6,872,681 B2 | 3/2005 | Niu et al. | |
| 6,906,911 B2 | 6/2005 | Ikeda et al. | |
| 6,914,341 B1 | 7/2005 | McIntyre | |
| 6,924,059 B1 | 8/2005 | Kawakami et al. | |
| 6,962,823 B2 | 11/2005 | Empedocles et al. | |
| 7,070,833 B2 | 7/2006 | Smith et al. | |
| 7,126,207 B2 | 10/2006 | Mosley et al. | |
| 7,201,627 B2 | 4/2007 | Ohnuma | |
| 7,327,556 B2 | 2/2008 | Ro et al. | |
| 7,335,395 B2 | 2/2008 | Ward et al. | |
| 7,381,367 B1 | 6/2008 | Baker et al. | |
| 7,511,941 B1 | 3/2009 | Gallay et al. | |
| 7,699,102 B2 | 4/2010 | Storm et al. | |
| 7,785,558 B2 | 8/2010 | Hikata | |
| 7,897,209 B2 | 3/2011 | Shibuya et al. | |
| 7,982,439 B2 | 7/2011 | Trainor et al. | |
| 7,999,695 B2 | 8/2011 | Rodney et al. | |
| 8,025,971 B2 | 9/2011 | Maeno et al. | |
| 8,168,331 B2 | 5/2012 | Best et al. | |
| 8,531,818 B2 * | 9/2013 | Hashimoto et al. | 361/502 |
| 8,760,851 B2 | 6/2014 | Signorelli et al. | |
| 2001/0006108 A1 | 7/2001 | Brett | |
| 2002/0043369 A1 | 4/2002 | Vinegar et al. | |
| 2002/0159943 A1 | 10/2002 | Smalley et al. | |
| 2002/0177018 A1 | 11/2002 | Fuglevand | |
| 2003/0003359 A1 | 1/2003 | Banno et al. | |
| 2003/0027038 A1 | 2/2003 | Tsukamoto et al. | |
| 2003/0030969 A1 | 2/2003 | Farahmandi et al. | |
| 2003/0081372 A1 | 5/2003 | Nakazawa et al. | |
| 2004/0131937 A1 | 7/2004 | Chen et al. | |
| 2004/0188350 A1 | 9/2004 | Beste et al. | |
| 2004/0229117 A1 | 11/2004 | Mitani et al. | |
| 2005/0152096 A1 | 7/2005 | Farahmandi et al. | |
| 2005/0208207 A1 | 9/2005 | Hinoki et al. | |
| 2005/0230270 A1 | 10/2005 | Ren et al. | |
| 2005/0231893 A1 | 10/2005 | Harvey | |
| 2005/0234177 A1 | 10/2005 | Zaghib et al. | |
| 2005/0238810 A1 | 10/2005 | Scaringe et al. | |
| 2006/0019168 A1 | 1/2006 | Li et al. | |
| 2006/0115722 A1 | 6/2006 | Kim | |
| 2006/0194102 A1 | 8/2006 | Keshishian et al. | |
| 2006/0256506 A1 | 11/2006 | Konuma et al. | |
| 2006/0279906 A1 | 12/2006 | Stemen et al. | |
| 2007/0015336 A1 | 1/2007 | Farahmandi et al. | |
| 2007/0076349 A1 | 4/2007 | Dementiev et al. | |
| 2007/0097598 A1 | 5/2007 | Siggel et al. | |
| 2007/0146965 A1 | 6/2007 | Mitchell et al. | |
| 2007/0188977 A1 | 8/2007 | Takeda et al. | |
| 2007/0254213 A1 | 11/2007 | Best et al. | |
| 2007/0258192 A1 | 11/2007 | Schindall et al. | |
| 2007/0258193 A1 | 11/2007 | Zhong et al. | |
| 2007/0259216 A1 | 11/2007 | Logan | |
| 2007/0292746 A1 | 12/2007 | Sloop | |
| 2008/0013224 A1 | 1/2008 | Kim et al. | |
| 2008/0068801 A1 | 3/2008 | Wilk | |
| 2008/0083626 A1 | 4/2008 | Kubo et al. | |
| 2008/0090183 A1 | 4/2008 | Zhu et al. | |
| 2008/0094777 A1 | 4/2008 | Itahashi et al. | |
| 2008/0192407 A1 | 8/2008 | Lu et al. | |
| 2008/0316678 A1 | 12/2008 | Ehrenberg et al. | |
| 2009/0011330 A1 | 1/2009 | Onodera et al. | |
| 2009/0021890 A1 | 1/2009 | Bourcier et al. | |
| 2009/0250409 A1 | 10/2009 | Fiene et al. | |
| 2009/0272935 A1 | 11/2009 | Hata et al. | |
| 2009/0272946 A1 | 11/2009 | Lu | |
| 2009/0294753 A1 | 12/2009 | Hauge et al. | |
| 2009/0303658 A1 | 12/2009 | Hiroyuki et al. | |
| 2010/0046142 A1 | 2/2010 | Aitchison et al. | |
| 2010/0119934 A1 | 5/2010 | Ushio et al. | |
| 2010/0134955 A1 | 6/2010 | O'Connor et al. | |
| 2010/0196600 A1 | 8/2010 | Shibuya et al. | |
| 2011/0080689 A1 | 4/2011 | Bielawski et al. | |
| 2011/0085285 A1 | 4/2011 | Zednicek et al. | |
| 2011/0141661 A1 | 6/2011 | Muthu et al. | |
| 2011/0150736 A1 | 6/2011 | Hagiwara et al. | |
| 2011/0151317 A1 | 6/2011 | Giroud et al. | |
| 2011/0170236 A1 | 7/2011 | Young | |
| 2012/0154979 A1 | 6/2012 | Signorelli et al. | |
| 2012/0313586 A1 | 12/2012 | Signorelli et al. | |
| 2013/0029215 A1 | 1/2013 | Signorelli et al. | |
| 2013/0044130 A1 | 2/2013 | Geisner et al. | |
| 2013/0044405 A1 | 2/2013 | Brambilla et al. | |
| 2013/0045157 A1 | 2/2013 | Brambilla et al. | |
| 2013/0141840 A1 | 6/2013 | Cooley et al. | |
| 2014/0042988 A1 | 2/2014 | Kuttipillai | |
| 2014/0057164 A1 | 2/2014 | Brambilla et al. | |
| 2014/0265565 A1 | 9/2014 | Cooley et al. | |
| 2014/0265580 A1 | 9/2014 | Cooley et al. | |

OTHER PUBLICATIONS

International Search Report from PCT/US2012/039342, mailed Dec. 6, 2012.
International Search Report from PCT/US2012/041438, mailed Nov. 19, 2012.
International Search Report from PCT/US2012/045994, mailed Jan. 25, 2013.
International Search Report from PCT/US2012/047474, mailed Jan. 31, 2013.
International Search Report from PCT/US2013/027697, mailed Jun. 26, 2013.
International Search Report from PCT/US2014/02992, mailed Oct. 7, 2014.
International Search Report from PCT/US2014/030310, mailed Oct. 10, 2014.
Notice of Allowance dated May 1, 2014, U.S. Appl. No. 12/928,896.
Office Action dated Dec. 11, 2013, U.S. Appl. No. 12/928,897.
Office Action dated Jul. 16, 2014, U.S. Appl. No. 12/928,897.
Office Action dated Jun. 18, 2014, U.S. Appl. No. 131588,452.
Office Action dated May 29, 2014, U.S. Appl. No. 13/560,628.
Office Action dated Oct. 15, 2014, U.S. Appl. No. 131587,037.
Written Opinion of the International Searching Authority from PCT/US2007/068314, mailed Feb. 13, 2008.
Written Opinion of the International Searching Authority from PCT/US2012/039342, mailed Dec. 6, 2012.
Written Opinion of the International Searching Authority from PCT/US2012/041438, mailed Nov. 19, 2012.
Written Opinion of the International Searching Authority from PCT/US2012/045994, mailed Dec. 26, 2012.
Written Opinion of the International Searching Authority from PCT/US2012/047474, mailed Jan. 27, 2014.
Written Opinion of the International Searching Authority from PCT/US2013/027697, mailed Jun. 26, 2013.
Written Opinion of the International Searching Authority from PCT/US2012/027697, mailed Mar. 25, 2013.

(56) References Cited

OTHER PUBLICATIONS

International search Report of the International Searching Authority from PCT/US2012/027697, mailed Mar. 21, 2013.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Emmenegger, et al., "Investigation Of Electrochemical Double-layer {Ecol} Capacitors Electrodes Based On Carbon Nanotubes And Activated Carbon Materials," J. Of Power Sources, 2003, pp. 321-329, vol. 124.
Halber, "Researchers Fired Up Over New Battery", the Tech, Feb. 8, 2006, pp. 1, 5, vol. 50, No. 6.
Hensley, et al., "The evolution of oilfield batteries", Oilfield Review, Autumn 1998, pp. 42-57.
Hyeok, et al., "Electrochemical Properties Of High-Power Supercapacitors Using Single-Walled Carbon Nanotube Electrodes," Adv. Funct. Mater., Oct. 2001, 387-392, vol. 11, No. 5.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. Of Energy Grant No. DE-FG02-06ER84598 for the period Jun. 28, 2006 to Mar. 27, 2007.
Liu, et al., "Graphene-Based Supercapacitor with an Ultrahigh Energy Density," Nano Lett, pp. 4863-4868, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Murakami, et al., "Growth Of Vertically Aligned Single-walled Carbon Nanotube Films On Quartz Substrates And Their Optical Anisotropy," Chem. Phys. Lett., 2004, pp. 298-303, vol. 385.
Ngo, et al., "Thermal properties of imidazolium ionic liquids," Thermochimica Acta, pp. 97-102, 2000, vol. 357-58.
Nishida, et al., "Physical and electrochemical properties of 1-alkyl-3-methylimidazolium tetrafluoroborate for electrolyte," J. Fluorine Chem., pp. 135-141, 2003, vol. 120.
Niu, et al., "High Power Electrochemical Capacitors Based On Carbon Nanotube Electrodes," Appl. Phys. Lett., Mar. 17, 1997, pp. 1480-1482, vol. 70, No. 11.
Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoronnethylsulfonyl)imide," J. Mol. Liq., pp. 43-50, Aug. 24, 2010, vol. 157.
Signorelli, et al., "Carbon Nanotube Enhanced Ultracapacitor", Sep. 2004.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.
Wongwiriyapan, et al., "Direct Grotwh of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
Schneuwly, et al. "Properties of supercapacitors From the state-of-the-ar to future trends" Proc. PCIM 2000.

* cited by examiner

HIGH POWER AND HIGH ENERGY ELECTRODES USING CARBON NANOTUBES

STATEMENT OF FEDERALLY SPONSORED RESEARCH

This invention was made with government support under grant DE-AR0000035/0001 awarded by the Unites States Department of Energy (ARPA-E). The United States government has certain rights in the invention.

BACKGROUND OF THE INVENTION

1. Field of the Invention

The present invention relates to producing aligned carbon-nanotube aggregates and, in particular, to methods and apparatus for producing carbon-nanotube aggregates.

2. Description of the Related Art

Carbon nanotubes (hereinafter referred to also as "CNTs") are carbon structures that exhibit a variety of properties. Many of the properties suggest opportunities for improvements in a variety of technology areas. These technology areas include electronic device materials, optical materials as well as conducting and other materials. For example, CNTs are proving to be useful for energy storage in capacitors.

However, effective transfer of the CNTs onto a current collector for a capacitor has proven to be challenging. Further, techniques have not enabled transfer of CNTs in a form that will provide for desired power capabilities.

Thus, what are needed are methods and apparatus for production of a high power electrode based on carbon nanotubes. Preferably, the methods and apparatus are simple to perform and thus offer reduced cost of manufacture, as well as an improved rate of production.

BRIEF SUMMARY OF THE INVENTION

In one embodiment, an electrode is provided. The electrode includes a current collector that has at least one layer of compressed carbon nanotubes disposed thereon.

In another embodiment, a method for fabricating an electrode is provided. The method includes selecting a current collector that has a bonding layer disposed thereon; and bonding to the bonding layer another bonding layer including a layer of aligned carbon nanotubes disposed thereon.

In yet another embodiment, a method for fabricating an aligned carbon nanotube aggregate for an electrode is provided. The method includes selecting a substrate; growing the aligned carbon nanotube aggregate onto the substrate; and disposing a bonding layer onto the aligned carbon nanotube aggregate following the growth thereof, wherein the bonding layer is adapted for bonding with a current collector of the electrode.

In a further embodiment, an ultracapacitor is provided. The ultracapacitor includes at least one electrode comprising a current collector that has at least one layer of compressed carbon nanotubes disposed thereon.

In yet another embodiment, a method for fabricating an ultracapacitor is provided. The method includes selecting an electrode having at least one layer of compressed carbon nanotubes disposed thereon and including the electrode in the ultracapacitor.

BRIEF DESCRIPTION OF DRAWINGS

The foregoing and other features and advantages of the invention are apparent from the following detailed description taken in conjunction with the accompanying drawings in which.

DETAILED DESCRIPTION OF THE INVENTION

Disclosed are methods and apparatus for providing a high-power electrode, where the electrode includes at least one layer of carbon nanotube aggregate (CNT). Advantageously, the electrode may be fabricated from mass-produced CNT and exhibits, among other things, higher gravimetric power density (power as a function of weight) and volumetric power density (power as a function of volume) than previously achievable. Further, the high-power electrode exhibits a low internal resistance and can be fabricated to provide high voltages (of about four or more volts).

In order to provide some context for the teachings herein, reference is first made to U.S. Pat. No. 7,897,209, entitled "Apparatus and Method for Producing Aligned Carbon Nanotube Aggregate." This patent is incorporated herein by reference, in its entirety.

The foregoing patent (the "'209 patent") teaches a process for producing aligned carbon nanotube aggregate." Accordingly, the teachings of the '209 patent, which are but one example of techniques for producing aligned carbon nanotube aggregate, may be used to produce carbon nanotube aggregate (CNT) referred to herein.

One example of a device incorporating an electrode as provided herein is provided in U.S. Patent Application Publication No. 2007-0258192, entitled "Engineered Structure for Charge Storage and Method of Making," also incorporated herein by reference, in its entirety. In general, methods and apparatus disclosed herein may be used to enhance an energy storage system, such as the embodiments disclosed in this publication. One embodiment of such energy storage is referred to as an "ultracapacitor." However, it should be recognized that the teachings herein may be applicable to other embodiments of energy storage and are therefore not limited to practice with an ultracapacitor.

Figure 1:
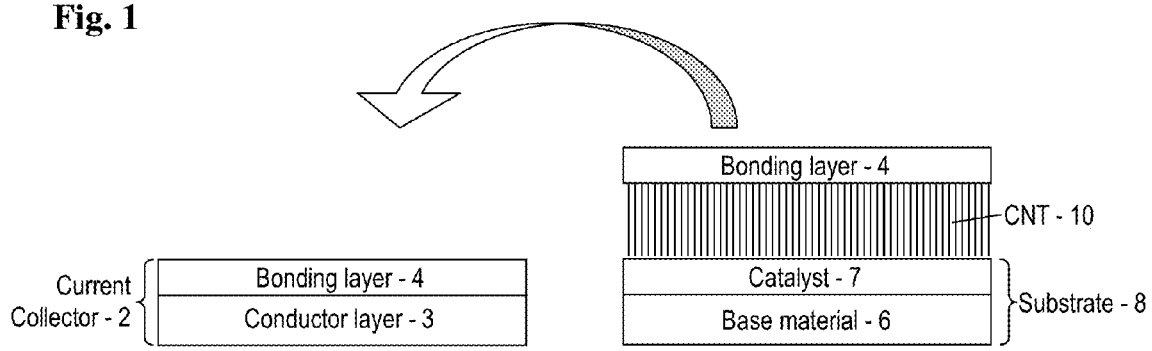
FIG. 1 is a block diagram depicting a current collector and a substrate onto which a plurality of carbon nanotubes (CNT) have been formed.

Referring now to FIG. 1, there is a shown a first component, a current collector 2. Generally, the current collector 2 includes a conductor layer 3, and may include a bonding layer 4. The conductor layer 3 may be fabricated from any material suited for conducting charge in the intended application. An exemplary material includes aluminum. The conductor layer 3 may be presented as a foil, a mesh, a plurality of wires or in other forms. Generally, the conductor layer 3 is selected for properties such as conductivity and being electrochemically inert.

In some embodiments, the conductor layer 3 is prepared by removing an oxide layer thereon. The oxide may be removed by, for example, etching the conductor layer 3 with KOH.

In some embodiments, a bonding layer 4 is disposed on the conducting layer 3. The bonding layer 4 may appear as a thin layer, such as layer that is applied by sputtering, e-beam or through another suitable technique. In various embodiments, the bonding layer 4 is between about 1 nm to about 100 nm.

Generally, the bonding layer 4 is selected for its properties such as conductivity, being electrochemically inert and compatibility with the material of the conductor layer 3. Some exemplary materials include aluminum, gold, silver, palladium, titanium, tin and platinum as well as alloys or in combinations of materials, such as Fe—Cr—Ni.

A second component includes a substrate 8 that is host to the carbon nanotube aggregate (CNT) 10. Some exemplary techniques for providing the CNT 10 are provided in the '209 patent. In the embodiment shown in FIG. 1, the substrate 8 includes a base material 6 with a thin layer of a catalyst 7 disposed thereon.

In general, the substrate 8 is at least somewhat flexible (i.e., the substrate 8 is not brittle), and is fabricated from components that can withstand environments for deposition of the CNT 10 (e.g., a high-temperature environment of between about 400 degrees Celsius to about 1,100 degrees Celsius).

Once the CNT 10 have been fabricated, another bonding layer 4 is disposed thereon. In some embodiments, the another bonding layer 4 is between about 10 nm to 1,000 nm thick. Subsequently, the bonding layer 4 of the current collector 2 is mated with the another bonding layer 4 disposed over the CNT 10, as shown in FIG. 2.

Figure 2:
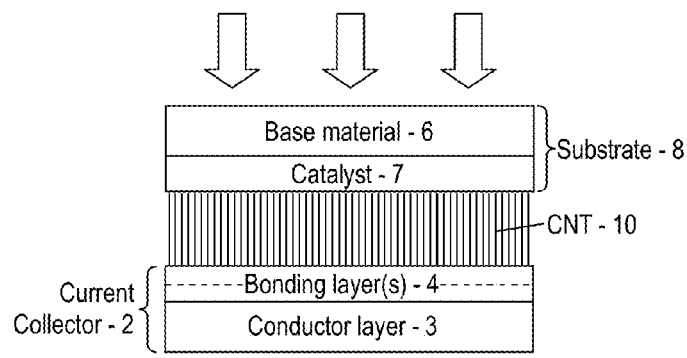
FIG. 2 is a block diagram depicting loading the CNT of FIG. 1 onto the current collector.

FIG. 2 illustrates aspects of mating the CNT 10 with the current collector 2. As implied by the downward arrows, pressure is applied onto the base material 6. The application of the CNT 10 may be accompanied by heating of the components. As an example, when platinum is used in the bonding layers 4, heating to between about 200 degrees Celsius to about 250 degrees Celsius is generally adequate. Subsequently, the CNT 10 and the catalyst 7 are separated, with a resulting layer of CNT 10 disposed onto the current collector 2.

Various post-manufacture processes may be completed to encourage separation of the CNT 10 from the catalyst 7. For example, following completion of deposition, the substrate 8 including the CNT 10 thereon may be exposed to (e.g., heated in) an environment of room air, carbon dioxide or another oxidative environment. Generally, the post-manufacture treatment of the CNT 10 includes slowly ramping the CNT 10 to an elevated temperature, and then maintaining the CNT 10 at temperature for a few hours at a reduced pressure (i.e., below 1 atmosphere).

Figure 3:
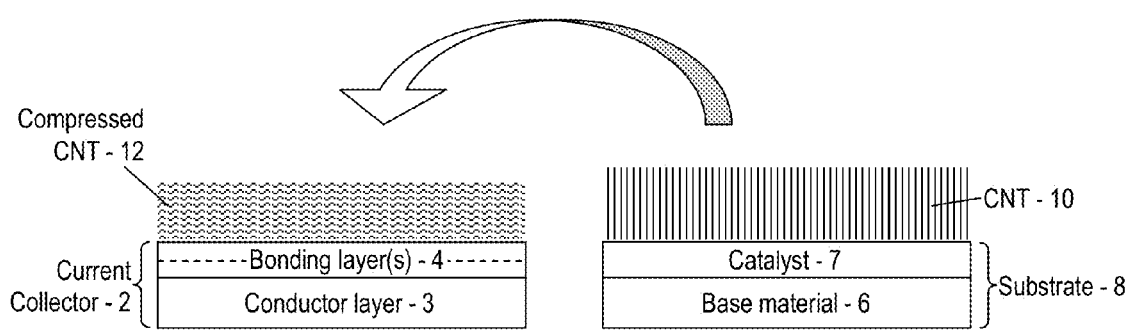
FIG. 3 is a block diagram depicting the loaded current collector of FIG. 2, as well as another substrate prepared for transfer of additional CNT onto the loaded current collector.

As shown in FIG. 3, the process of transferring the CNT 10 onto the current collector 2 with the addition of pressure results in a layer of compressed CNT 12. The compressed CNT 12, which now include physical defects, such as windows and cracks, generally provide more surface area for charge storage, while in a smaller volume than the uncompressed CNT 10. Also shown in FIG. 3, is the addition of another layer of CNT 10.

Figure 4:
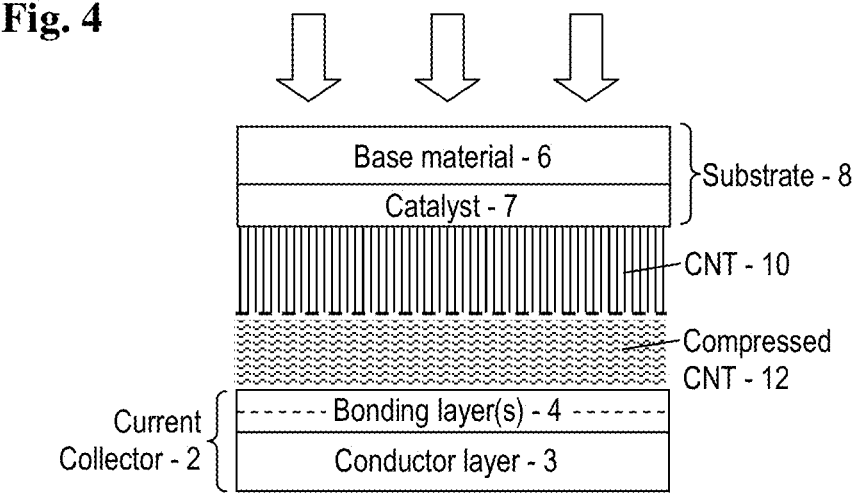
FIG. 4 is a block diagram depicting loading of additional CNT onto the loaded current collector.
Figure 5:
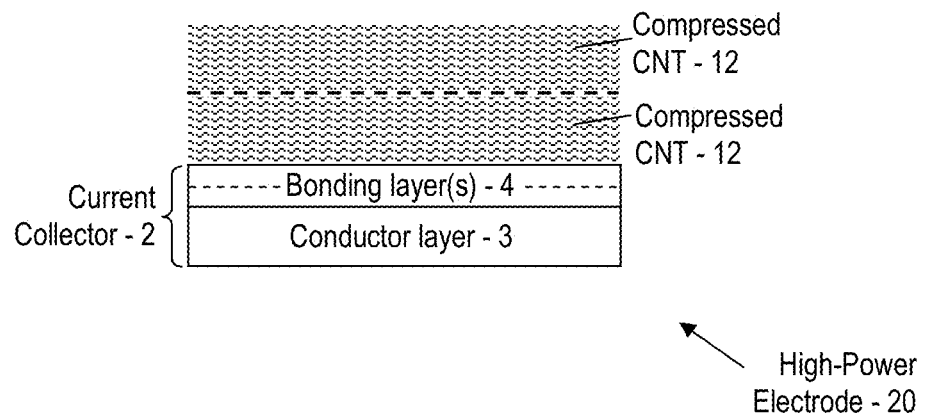
FIG. 5 is a block diagram depicting a high-power electrode resulting from multiple transfers of CNT onto the current collector of FIG. 1.

As shown in FIG. 4, the another layer of CNT 10 may be applied over the compressed CNT 12. In some embodiments, this process involves applying a nominal amount of pressure (such as by hand). Generally, it is considered that the another layer of CNT 10 is transferred to (i.e., adheres to) the compressed CNT 12 by the Van der Waals forces between the carbon nanotubes. Advantageously, this results in another layer of compressed CNT 12 (i.e., another thickness of compressed CNT 12) on the current collector 2.

The process may be repeated to provide a plurality of thicknesses of compressed CNT 12 on the current collector 2. In general, however, it is expected that certain practical limitations will be realized. That is, for example, compounding defects in transfer of each layer may result in a layer of compressed CNT 12 that does not exhibit desired performance for charge storage. However, it is also expected that as transfer protocols continue to improve, that the addition of an ever greater number of layers will be possible.

Accordingly, the current collector 2 with at least one layer of compressed CNT 12 to a plurality of layers of compressed CNT 12 disposed thereon may be used as a charge storage device (i.e., a high-power electrode). Generally, such embodiments of the high-power electrode are particularly well adapted for use in a capacitor, or an ultracapacitor. In addition to some of the foregoing mentioned advantages (higher gravimetric and volumetric power densities, low internal resistance and high voltage delivery), less electrolyte is required. Thus, users are provided with an improved performance energy storage that is less expensive to manufacture.

In other embodiments, consideration may be given to the particular properties of the base material 6, the catalyst 7, the conductor layer 3 and the bonding layers 4. That is, for example, if the foregoing fabrication is completed in a substantially oxygen-free environment, it is expected that other materials and processes may be used (or omitted) to provide for the current collector 2 with at least one layer of compressed CNT 12 to a plurality of layers of compressed CNT 12. Accordingly, these and other embodiments as may be devised by one skilled in the art are within the ambit of the invention and the teachings herein.

In further embodiments, at least one other layer may be included. For example, an ohmic contact layer may be included, and provided to enhance ohmic contact between the another bonding layer 4, the compressed CNT 12 (which also may be referred to as an "energy storage layer," an "active layer" and by other similar terms) or another layer. In another example, an adhesion layer may be included, and provided to enhance adhesion between the another bonding layer 4 and the compressed CNT 12, or another layer. Materials in the additional or optional layers may be chosen according to at least one property, such as electrical conductivity, compatibility and the like.

With regard to the ohmic contact layer, the ohmic contact layer may be useful for achieving an ohmic contact with the carbonaceous layer. If the ohmic contact layer will be exposed to the electrolyte in which the electrode will ultimately be immersed (such as through a porous carbonaceous layer), the ohmic contact layer material should be chosen for good electric compliance, usually a suitably low reaction rate, with that particular embodiment of electrolyte. The ohmic contact layer may be deposited onto the carbonaceous layer using magnetron sputtering, thermal evaporation, or a similar process. Exemplary materials that may be used in the ohmic contact layer are aluminum (Al), tantalum (Ta), and platinum (Pt). In general, a thickness of this ohmic contact layer varies in the range of from about 1 nm to about 10 μm.

With regard to the "adhesion layer," this layer may be used to improve adhesion between the current collector 2 and another layer. The adhesion layer may be deposited onto the current collector 2 using magnetron sputtering or a similar process. Typical materials included in the adhesion layer are titanium (Ti), chromium (Cr), titanium-tungsten (Ti—W) or a combination of those materials. If the conductivity of the material making up the adhesion layer is relatively low, then its thickness should be limited to achieve suitable current handling performance. In general, a thickness of this adhesion layer varies between about 1 nanometer (nm) and about 100 (nm).

Having disclosed aspects of embodiments of the production apparatus and techniques for fabricating aggregates of carbon nanotubes, it should be recognized that a variety of embodiments may be realized. Further a variety of techniques of fabrication may be practiced. For example, steps of fabrication may be adjusted, as well as techniques for joining, materials and chemicals used and the like.

As a matter of convention, it should be considered that the terms "may" as used herein is to be construed as optional; "includes," "has" and "having" are to be construed as not excluding other options (i.e., steps, materials, components, compositions, etc, . . . ); "should" does not imply a requirement, rather merely an occasional or situational preference. Other similar terminology is likewise used in a generally conventional manner.

While the invention has been described with reference to exemplary embodiments, it will be understood that various changes may be made and equivalents may be substituted for elements thereof without departing from the scope of the invention. For example, in some embodiments, one of the foregoing layers may include a plurality of layers there within. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrode comprising:
   a current collector comprising a first layer of compressed carbon nanotubes disposed thereon and a second layer of compressed carbon nanotubes disposed directly on the first layer of compressed carbon nanotubes.

2. The electrode as in claim 1, wherein the current collector comprises at least one of a conductor layer and a bonding layer.

3. The electrode as in claim 2, wherein the conductor layer is substantially oxide free.

4. The electrode as in claim 2, wherein the bonding layer comprises a first bonding layer applied over the conductor layer and a second bonding layer disposed between the first layer of compressed carbon nanotubes and the first bonding layer.

5. The electrode as in claim 2, wherein the bonding layer comprises at least one of iron, chromium, nickel, aluminum, gold, silver, palladium, titanium, tin, platinum and a combination of any of the foregoing materials.

6. The electrode as in claim 1, wherein the compressed carbon nanotubes of at least one of the first layer of compressed carbon nanotubes and the second layer of compressed carbon nanotubes are substantially aligned in a uniform direction.

7. The electrode of claim 1, wherein the first and second layers of compressed carbon nanotubes are bonded to each other by way of Van der Waals forces between the carbon nanotubes in each layer.

8. The electrode of claim 1, further comprising a third layer of compressed carbon nanotubes disposed directly on the second layer of compressed carbon nanotubes.

9. A method for fabricating an electrode, the method comprising:
   selecting a current collector comprising a bonding layer disposed thereon;
   bonding to the bonding layer another bonding layer comprising a layer of aligned carbon nanotubes disposed thereon; and
   removing a substrate from the carbon nanotubes thus exposing the carbon nanotubes.

10. The method as in claim 9, wherein the bonding comprises compressing the carbon nanotubes.

11. The method as in claim 10, further comprising disposing another layer of aligned carbon nanotubes directly onto the layer of carbon nanotubes.

12. The method as in claim 11, wherein the disposing comprises compressing the another layer directly onto the layer.

13. The method of claim 12, comprising bonding the layers of carbon nanotubes by way of Van der Waals forces between the carbon nanotubes in each layer.

14. The method of claim 12, further comprising disposing a third layer of carbon nanotubes directly onto the another layer and compressing the third layer of carbon nanotubes.

15. The method of claim 9, wherein removing a substrate from the carbon nanotubes comprises treating the carbon nanotubes to encourage separation from the substrate.

16. The method of claim 15, wherein treating the carbon nanotubes to encourage separation from the substrate comprises exposing the substrate with the carbon nanotubes thereon to an oxidative environment.

17. The method of claim 16, wherein treating the carbon nanotubes to encourage separation from the substrate comprises:
   ramping the temperature of the substrate with the carbon nanotubes thereon to an elevated temperature, and
   maintaining the temperature of the substrate with the carbon nanotubes thereon at the elevated temperature for a period of time in an environment having a pressure of less than 1 atm.

18. The method of claim 17, wherein the period of time comprises more than an hour.

19. The method of claim 18, wherein the period of time comprises a few hours.

* * * * *